United States Patent
Jiao et al.

(10) Patent No.: US 8,000,656 B1
(45) Date of Patent: Aug. 16, 2011

(54) APPARATUS AND METHODS FOR PERFORMING CALIBRATION OF A MOBILE COMPUTING DEVICE

(75) Inventors: Qingzhong Jiao, Fremont, CA (US); Wen Zhao, Cupertino, CA (US); Isabel Mahe, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 754 days.

(21) Appl. No.: 11/613,114

(22) Filed: Dec. 19, 2006

(51) Int. Cl.
  *H04B 17/00* (2006.01)
(52) U.S. Cl. .......... 455/67.11; 455/67.7; 455/67.14; 455/423; 714/742
(58) Field of Classification Search .......... 455/67.11, 455/67.7, 67.14, 423, 424, 425; 714/742
  See application file for complete search history.

(56) References Cited

U.S. PATENT DOCUMENTS

| | | | | |
|---|---|---|---|---|
| 7,136,637 | B2* | 11/2006 | Yang | 455/423 |
| 7,440,932 | B2* | 10/2008 | Gartland et al. | 706/46 |
| 2003/0078515 | A1* | 4/2003 | Menzel et al. | 600/559 |
| 2004/0220762 | A1* | 11/2004 | Oeflein et al. | 702/107 |
| 2005/0075748 | A1* | 4/2005 | Gartland et al. | 700/108 |
| 2006/0154610 | A1* | 7/2006 | Rumney | 455/67.14 |
| 2007/0243825 | A1* | 10/2007 | Olgaard et al. | 455/67.11 |
| 2007/0266289 | A1* | 11/2007 | Yang | 714/742 |
| 2008/0114548 | A1* | 5/2008 | Pavel et al. | 702/14 |
| 2008/0285467 | A1* | 11/2008 | Olgaard | 370/242 |
| 2008/0287117 | A1* | 11/2008 | Olgaard et al. | 455/423 |
| 2008/0293363 | A1* | 11/2008 | Olgaard | 455/67.7 |

\* cited by examiner

*Primary Examiner* — Minh D Dao

(57) ABSTRACT

Various embodiments for performing calibration of a mobile computing device are described. In one or more embodiments, a device under test and a calibration test bench may be coupled by at least one of a wireless connection and a wired connection. The device under test may be arranged to receive one or more test command instructions from the calibration test bench and, in response, send an acknowledgment to the calibration test bench. In some embodiments, the device under test and the calibration test bench may be arranged to communicate according to a wireless device calibration protocol. Other embodiments are described and claimed.

30 Claims, 3 Drawing Sheets

300

ESTABLISH AT LEAST ONE OF A WIRELESS CONNECTION AND A WIRED CONNECTION TO A CALIBRATION TEST BENCH
302

RECEIVE ONE OR MORE TEST COMMAND INSTRUCTIONS FROM THE CALIBRATION TEST BENCH
304

SEND ACKNOWLEDGEMENT TO THE CALIBRATION TEST BENCH
306

EXECUTE TEST COMMAND INSTRUCTIONS AND PROVIDE TEST DATA TO THE CALIBRATION TEST BENCH OVER THE WIRELESS CONNECTION
308

FIG. 3

APPARATUS AND METHODS FOR PERFORMING CALIBRATION OF A MOBILE COMPUTING DEVICE

BACKGROUND

A mobile computing device such as a combination handheld computer and mobile telephone or smart phone generally may provide voice and data communications functionality, as well as computing and processing capabilities. During production in a factory or when undergoing laboratory testing, many types of mobile computing devices must be calibrated on a device-per-device basis before being shipped or mass produced. The calibration of each mobile computing device generally involves the taking of various transmitter and receiver testing measurements. The efficiency at which calibration is performed significantly impacts the daily volume of the production line. Accordingly, there exists the need for an improved apparatus and methods for performing calibration of a mobile computing device.

BRIEF DESCRIPTION OF THE DRAWINGS

FIG. 3 illustrates a logic flow in accordance with one or more embodiments.

DETAILED DESCRIPTION

Various embodiments are directed to performing calibration of a mobile computing device. In one or more embodiments, a device under test and a calibration test bench may be coupled by at least one of a wireless connection and a wired connection. The device under test may be arranged to receive one or more test command instructions from the calibration test bench and, in response, send an acknowledgment to the calibration test bench. In some embodiments, the device under test and the calibration test bench may be arranged to communicate according to a wireless device calibration protocol.

Figure 1:
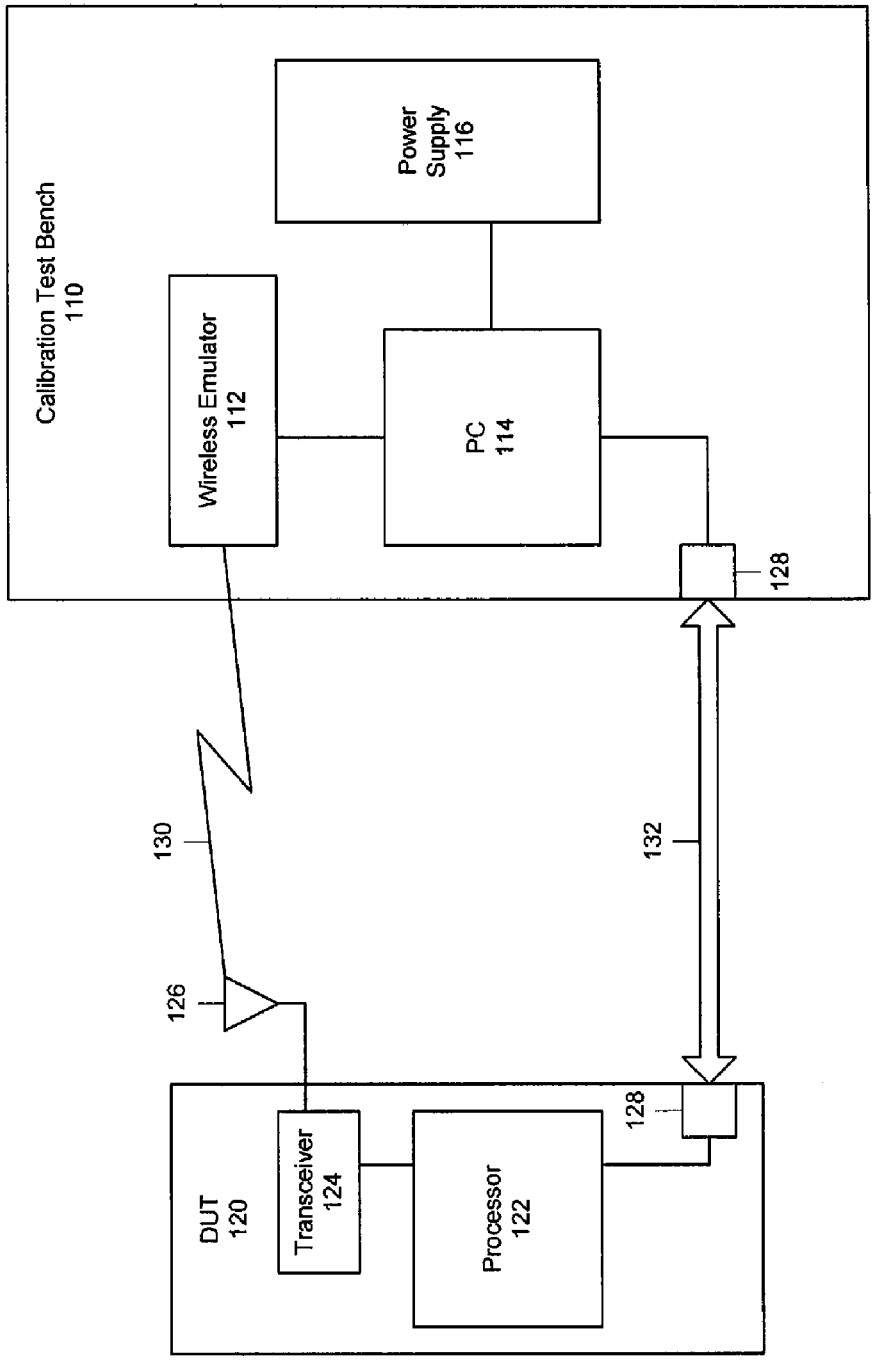
FIG. 1 illustrates a calibration system in accordance with one or more embodiments.

FIG. 1 illustrates a calibration system 100 in accordance with one or more embodiments. The calibration system 100 may comprise calibration test bench 110 coupled to a device under test (DUT) 120. As shown, the calibration test bench 110 may comprise a wireless emulator 112 coupled to a personal computer (PC) 114. The wireless emulator 112 and the PC 114 may be arranged to communicate over an interface such as a general purpose interface bus (GPIB).

The wireless emulator 112 may comprise, for example, hardware and/or software for performing calibration of the DUT 120. In one or more embodiments, the wireless emulator 112 may be arranged to perform calibration according to a calibration test set. The calibration test set may comprise various transmitter and receiver testing measurements for the DUT 120 such as transmitting power, received signal strength indication (RSSI), channel power, mean power, radio resource control (RRC) power, adjacent channel leakage ratio (ACLR), spectrum emission mask measurements, power versus time measurements, phase and amplitude versus time (PAvT) measurements, phase and frequency error, error vector magnitude (EVM) measurements, frequency error waveform quality, radio frequency (RF) generation, output RF spectrum monitoring, and so forth.

The calibration test set may comprise, for example, a calibration test set for one or more Code Division Multiple Access (CDMA) systems, Wide-band CDMA (WCDMA) systems, CDMA-2000 systems, CDMA/1xRTT systems, Evolution Data Optimized (EVDO) systems, Evolution For Data and Voice (EVDV) systems, Global System for Mobile Communications (GSM) systems, General Packet Radio Service (GPRS) systems, Enhanced GPRS (EGPRS) systems, Enhanced Data Rates for Global Evolution (EDGE) systems, Universal Mobile Telephone System (UMTS) systems, High Speed Downlink Packet Access (HSDPA) systems, High Speed Uplink Packet Access (HSUPA), and so forth.

The PC 114 may comprise any suitable computing or processing device arranged to send test commands for synchronizing the calibration test bench 110 with the DUT 120 and for instructing the DUT 120 to perform various operations required for calibration. The test commands when executed may cause the DUT 120 to synchronize with the calibration test bench 110 and to perform calibration operations including, for example, enter a certain mode such as a calibration mode, switch to a different mode, select frequency band, switch frequency band, select channel, switch to a different channel, transmit test signal, receive test signal, and so forth.

The PC 114 also may be arranged to inform the wireless emulator 112 that the DUT 120 is ready for calibration and to instruct the wireless emulator 112 to perform calibration of the DUT 120 according to the calibration test set. The PC 114 may be coupled to a power source 116 arranged to supply dynamic power when measuring power characteristics, such as power sensitivity, of the DUT 120. The PC 114 also may be coupled to an input/output (I/O) interface 118 such as a serial connection port for establishing a wired connection from the calibration test bench 110 to an external device.

In one or more embodiments, the DUT 120 may be implemented as a mobile computing device such as combination handheld computer and mobile telephone, sometimes referred to as a smart phone. Examples of smart phones include, for example, Palm® products such as Palm® Treo™ smart phones. When implemented as a smart phone, the DUT 120 may comprise various components such as a keyboard, programmable keys, buttons, switches, a microphone, an audio headset, a camera, a touch-sensitive display screen, a stylus, and so forth.

It is to be understood that while the DUT 120 may be implemented as a smart phone by way of example, the embodiments are not limited in this context. For example, the DUT 120 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

The DUT 120 may provide voice communications functionality in accordance with different types of cellular radiotelephone systems. Examples of cellular radiotelephone systems may include CDMA systems, GSM systems, UMTS systems, and so forth. In addition to voice communications functionality, the DUT 120 may be arranged to provide WWAN data communications functionality in accordance with EVDO systems, EVDV) systems, CDMA/1 xRTT systems, GSM/GPRS systems, EDGE systems, HSDPA systems, HSUPA systems, and so forth.

The DUT 120 may be arranged to provide data communications functionality in accordance with different types of WLAN systems. Examples of suitable WLAN systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The DUT 120 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

As shown in FIG. 1, the DUT 120 may comprise a processor module 122. In various embodiments, the processor module 122 may comprise one or more processors such as a host processor and/or a radio processor. In such embodiments, the host processor may be arranged to provide processing or computing resources for the DUT 120. The radio processor may be responsible for performing various voice and data communications operations for the DUT 120 such as transmitting and receiving voice and data information over one or more wireless communications channels. The host processor and the radio processor may communicate with each other using interfaces such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth. Although some embodiments may comprise a dual-processor architecture, it is worthy to note that the DUT 120 may comprise any suitable processor architecture and/or any suitable number of processors consistent with the described embodiments.

The host processor may be implemented as a host central processing unit (CPU) using any suitable processor or logic device, such as a as a general purpose processor. Although some embodiments may be described with the host processor implemented as a CPU or general purpose processor by way of example, it may be appreciated that the embodiments are not limited in this context. For example, the host processor may comprise, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

The host processor may be responsible for executing various software programs such as system programs and application programs to provide computing and processing operations for the DUT 120. System programs generally may assist in the running of the DUT 120 and may be directly responsible for controlling, integrating, and managing the individual hardware components of the computer system. Examples of system programs may include, without limitation, an operating system (OS), device drivers, programming tools, utility programs, software libraries, application programming interfaces (APIs), and so forth. The DUT 120 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Application programs generally may allow a user to accomplish one or more specific tasks. In various implementations, the application programs may provide one or more graphical user interfaces (GUIs) to communicate information between the DUT 120 and a user. Examples of application programs may include, without limitation, one or more messaging applications (e.g., telephone, voicemail, facsimile, e-mail, IM, SMS, MMS, video conferencing), web browser applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth.

As mentioned above, the radio processor may perform voice and/or data communication operations for the DUT 120. For example, the radio processor may be arranged to communicate voice information and/or data information over one or more assigned frequency bands of a wireless communication channel. In various embodiments, the radio processor may be implemented as a communications processor using any suitable processor or logic device, such as a modem processor or baseband processor. In such embodiments, the radio processor may perform analog and/or digital baseband operations for the DUT 120. For example, the radio processor may perform digital-to-analog conversion (DAC), analog-to-digital conversion (ADC), modulation, demodulation, encoding, decoding, encryption, decryption, and so forth. Although the radio processor implemented as a modem processor or baseband processor by way of example, it may be appreciated that the embodiments are not limited in this context. For example, the radio processor may comprise, or be implemented as, a digital signal processor (DSP), media access control (MAC) processor, or any other type of communications processor in accordance with the described embodiments.

As shown in FIG. 1, the DUT 120 may comprise a transceiver module 124 coupled to the processor module 122. The transceiver module 124 may comprise one or more transceivers or components arranged to communicate using different types of protocols, communication ranges, operating power requirements, RF sub-bands, information types (e.g., voice or data), use scenarios, applications, and so forth. The transceiver module 124 generally may be implemented using one or more chips as desired for a given implementation. Although the transceiver module 124 may be shown as being separate from and external to the processor module 124 for purposes of illustration, it is worthy to note that in various embodiments some portion or the entire transceiver module 124 may be included on the same integrated circuit as the processor module 122.

The transceiver module 124 may comprise, for example, one or more cellular transceivers or components arranged to support communication over a cellular voice channel for a system such as a CDMA, GSM, and/or UMTS cellular system. The transceiver module 124 also may comprise one or more WWAN transceivers or components arranged to support data communication over a WWAN data channel in accordance with one or more WWAN protocols such as EVDO protocols, EVDV protocols, CDMA/1xRTT protocols, GSM/GPRS protocols, EDGE protocols, HSDPA protocols, and so forth. The transceiver module 124 also may comprise one or more transceivers or components arranged to support data communication over a WLAN data channel in accordance with one or more WLAN protocols such as IEEE 802.11a/b/g/n protocols, IEEE 802.16 protocols, IEEE 802.20 protocols, PAN protocols, Infrared protocols, Bluetooth protocols, EMI protocols including passive or active RFID protocols, and so forth. In some implementations, the transceiver module 124 may comprise a Global Positioning System (GPS) transceiver to support position determination and/or location-based services.

The DUT 120 may comprise an antenna system 126 for transmitting and/or receiving electrical signals. As shown, the antenna system 126 may be coupled to the processor module 122 through the transceiver module 124. The antenna system 126 may comprise or be implemented as one or more internal antennas and/or external antennas. In various embodiments, the antenna system 126 may be tuned for operating at one or more frequency bands such as the 824-894 Megahertz (MHz) frequency band for GSM operations, the 1850-1990 MHz frequency band for Personal Communications Services (PCS) operations, the 1575 MHz frequency band for Global Positioning System (GPS) operations, the 824-860 MHz frequency band for NAMPS operations, the 1710-2170 MHz frequency band for Wide-band CDMA/Universal Mobile Telephone System (WCDMA/UMTS), the ISM band in 2.4 GHz range for WiFi and Bluetooth, and other frequency bands.

The DUT 120 may comprise an I/O interface 128 coupled to the processor module 122. In one or more embodiments, the I/O interface may comprise a serial connection port for establishing a wired connection to an external computer system. Although not illustrated, it can be appreciated that the DUT 120 may comprise other types of I/O devices such as an infrared port, integrated Bluetooth® wireless capability, and/or integrated 802.11x (WiFi) wireless capability, to enable wired (e.g., USB cable) and/or wireless connection to an external computer system, such as a local PC. In various implementations, the DUT 120 may be arranged to transfer and/or synchronize information with a local PC.

To perform calibration, the calibration test bench 110 may be coupled to the DUT 120 by at least one of a wireless connection 130 and a wired connection 132. The wireless connection 130 may comprise, for example, an RF connection, one or more RF channels, a portion of the RF spectrum, and/or one or more licensed or license-free RF frequency bands. The wired connection 132 may comprise, for example, a peripheral serial connection such as a USB connection or UART connection.

In one or more embodiment, both a wireless connection 130 and a wired connection 132 are established to calibrate the DUT 120. As shown in FIG. 1, for example, a wireless connection 130 (e.g., RF connection) may be established between the wireless emulator 112 of the calibration test bench 110 and the antenna system 126 and/or transceiver module 124 of the DUT 120. A wired connection 132 (e.g., UART connection) may be established between the I/O interface 118 (e.g., serial connection port) of the calibration test bench 110 and the I/O interface 128 (e.g., serial connection port) of the DUT 120.

In such embodiments, the PC 114 may be arranged to send test commands over the wired connection 132 for synchronizing the calibration test bench 110 with the DUT 120 and for instructing the DUT 120 to perform various operations required for calibration. The test commands may be received by the DUT 120 over the wired connection 132, decoded, and then executed causing the DUT 120 to synchronize with the calibration test bench 110 and to perform one or more calibration operations.

For example, the PC 114 may be arranged to send a test command over the wired connection 132 to synchronize the calibration test bench 110 with the DUT 120. In various implementations, the PC 114 may be arranged to simultaneously transmit a command to the wireless emulator 112 for synchronizing the calibration test bench 110 with the DUT 120. After synchronization, the PC 114 may send a test command over the wired connection 132 instructing the DUT 120 to enter a calibration mode. In general, the calibration mode may comprise a testing mode in which most of the software on the DUT 120 is not running.

In one or more embodiments, after entering the calibration mode, the DUT 120 may be arranged to send an acknowledgement to the calibration test bench 110. In various implementations, the acknowledgement may be sent over the wired connection 132. In addition, the DUT 120 may be arranged to respond to the calibration test bench 110 and/or PC 114 acknowledging receipt of one or more test commands even when in the calibration mode. By receiving an acknowledgment of the calibration mode and/or test commands from the DUT 120, the calibration test bench 110 and/or PC 114 may avoid costly delays caused by waiting, timing out, sending redundant commands, and so forth. Accordingly, the time required for calibration may be significantly reduced, for example, by approximately 20%.

Upon receiving the acknowledgement of the calibration mode from the DUT 120, the PC 114 may inform the wireless emulator 112 that the DUT 120 is ready for calibration. The PC 114 then may instruct the wireless emulator 112 to perform calibration of the DUT 120 according to the calibration test set.

In response, the wireless emulator 112 may obtain various transmitter and receiver testing measurements for the DUT 120 such as transmitting power measurements, RSSI measurements, channel power measurements, mean power measurements, RRC power measurements, ACLR measurements, spectrum emission mask measurements, power versus time measurements, PAvT measurements, phase and frequency error measurements, EVM measurements, frequency error waveform quality measurements, RF generation measurements, output RF spectrum monitoring, and so forth.

In one or more embodiments, the wireless emulator 112 may obtain transmitter and receiver testing measurements for the DUT 120 over the wireless connection 130. In various implementations, the wireless emulator 112 may comprise a CPU for formatting test data received through the wireless connection 130 and for storing the test data in a readily accessible area for substantially real-time presentation.

Once a particular test or set of testing procedures has completed, the PC 114 may send a command to the DUT 120 over the wired connection 132 instructing the DUT 120 to perform additional testing. For example, after testing for one channel has completed, the PC 114 may send a command instructing the DUT 120 to switch to a different channel. After decoding the command and switching to the different channel, the DUT 120 may send and acknowledgement to the PC 114 which, in turn, informs the wireless emulator 112 that the DUT 120 is ready for additional testing. The wireless emulator 112 then performs testing on the DUT 120 for the different channel.

Figure 2:
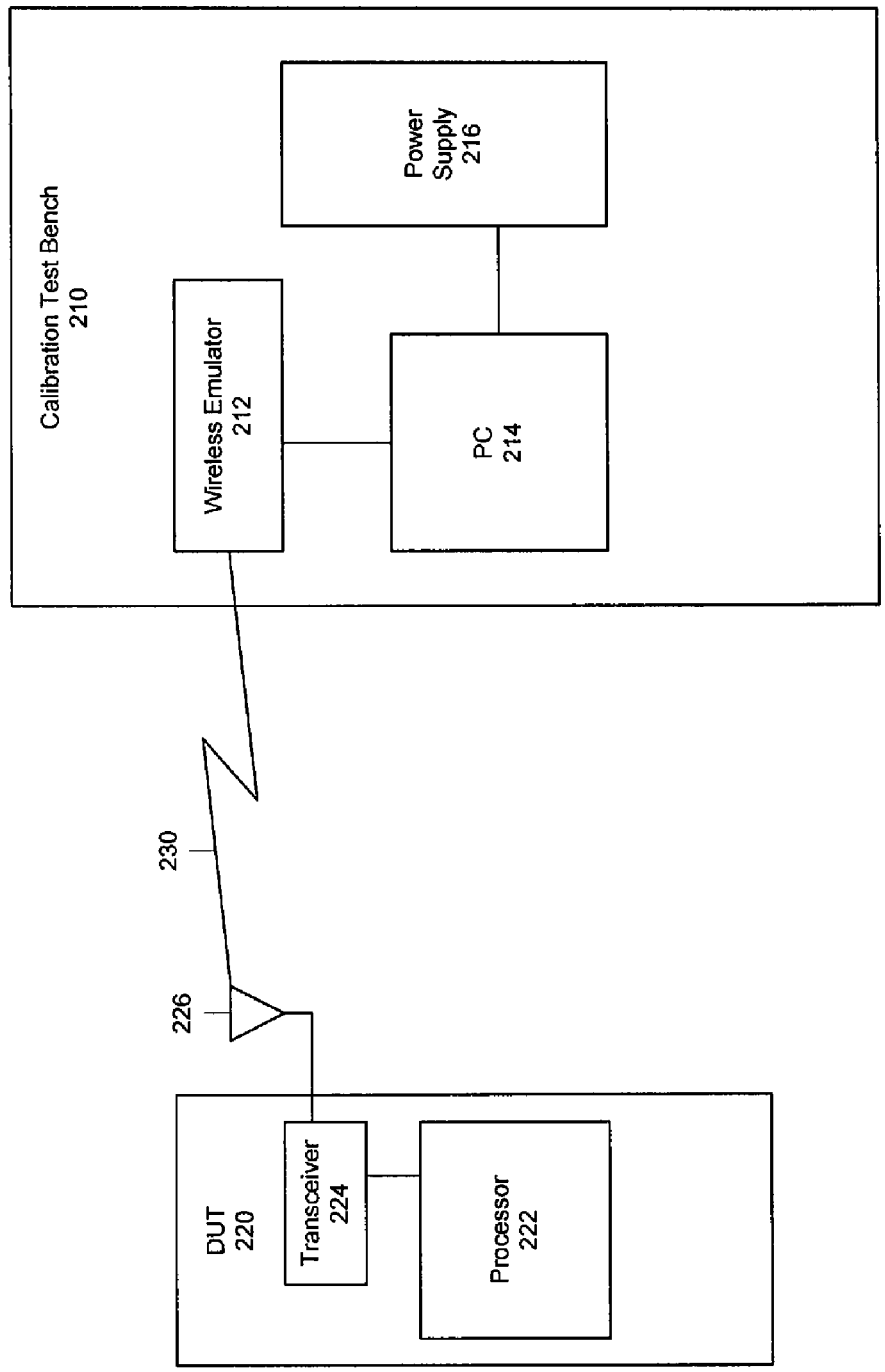
FIG. 2 illustrates a calibration system in accordance with one or more embodiments.

FIG. 2 illustrates a calibration system 200 in accordance with one or more embodiments. The calibration system 200 may comprise calibration test bench 210 coupled to a device under test (DUT) 220. In various embodiments, the DUT 220 may be implemented a mobile computing device as described above comprising, for example, a processor module 222, a transceiver module 224, and an antenna system 226.

As shown, the calibration test bench 210 may comprise a wireless emulator 212 coupled to a PC 214 over an interface such as a GPIB. The wireless emulator 212 may comprise, for example, hardware and/or software for performing calibration of the DUT 220. In one or more embodiments, the wireless emulator 212 may be arranged to perform calibration testing according to a calibration test set. The calibration test set may comprise, for example, various transmitter and receiver testing measurements as described above for one more of CDMA, WCDMA, CDMA-2000, CDMA/1xRTT, EVDO, EVDV, GSM, GPRS, EGPRS, EDGE, UMTS, HSDPA, HSUPA, and so forth.

The PC 214 may comprise any suitable computing or processing device arranged to instruct the wireless emulator 212 to perform calibration of the DUT 220 according to the calibration test set. The PC 214 also may be coupled to a power source 216 arranged to supply dynamic power when measuring power characteristics, such as power sensitivity, of the DUT 210.

In one or more embodiment, only the wireless connection 230 is established to calibrate the DUT 220. The wireless connection 230 may comprise, for example, an RF connection, one or more RF channels, a portion of the RF spectrum, and/or one or more licensed or license-free RF frequency bands. As shown in FIG. 2, for example, the wireless connection 230 (e.g., RF connection) may be established between the wireless emulator 212 of the calibration test bench 210 and the antenna system 226 and/or transceiver module 224 of the DUT 120.

In such embodiments, the test commands may be received by the DUT 220 over the wireless connection 230, decoded, and then executed causing the DUT 220 to synchronize with the calibration test bench 210 and to perform various operations required for calibration. As such, the calibration system 200 avoids the need to establish a wired connection such as a USB connection, UART connection, or other peripheral serial connection when performing calibration. Accordingly, the time required for calibration may be reduced.

In one or more embodiments, the calibration test bench 210 and the DUT 220 may be arranged to communicate over the wireless connection 230 according to a wireless device calibration protocol. The wireless device calibration protocol may comprise, for example, an RF chain defining the synchronization and command format between the wireless emulator 212 and the DUT 220. In such embodiments, the wireless emulator 212 and the DUT 210 may be configured to use the command format and synchronization signal implemented by the wireless device calibration protocol. The command format may define the various test commands and codes required to calibrate the DUT 220. The test commands, when executed, may cause the DUT 120 to synchronize with the calibration test bench 210 and to perform calibration operations including, for example, enter a certain mode such as a calibration mode, switch to a different mode, select frequency band, switch frequency band, select channel, switch to a different channel, transmit test signal, receive test signal, and so forth.

In various implementations, the wireless device calibration protocol may be supported by the particular type of DUT 220 and/or calibration test set. For example, if the DUT 220 is implemented as a GSM mobile computing device and/or calibration is to be performed according to a GSM calibration test set, the wireless device calibration protocol may comprise a GSM cellular protocol. In such implementation, the same RF chain may be used for synchronization, communicating test commands, and obtaining transmitter and receiver testing measurements over the wireless connection 230.

The test commands may be received by the DUT 220 over the wireless connection 230, decoded, and then executed causing the DUT 220 to synchronize with the calibration test bench 210 and to perform one or more calibration operations. For example, the PC 214 may be arranged to send a test command through the wireless emulator 212 and over the wireless connection 230 to synchronize the calibration test bench 210 with the DUT 220. After synchronization, the PC 214 may send a test command through the wireless emulator 212 and over the wireless connection 230 instructing the DUT 220 to enter a calibration mode.

In one or more embodiments, after entering the calibration mode, the DUT 220 may be arranged to send an acknowledgement to the calibration test bench 210 over the wireless connection 230. In addition, the DUT 220 may respond to the calibration test bench 210 over the wireless connection 230 acknowledging receipt of one or more test commands. By receiving an acknowledgment of the calibration mode and/or test commands from the DUT 220, the calibration test bench 210 and/or PC 214 may avoid costly delays caused by waiting, timing out, sending redundant commands, and so forth.

Upon receiving the acknowledgement of the calibration mode from the DUT 220, the wireless emulator 212 may recognize that the DUT 220 is ready for calibration and begin to perform calibration of the DUT 220 according to the calibration test set. Accordingly, the time required for calibration may be reduced.

The wireless emulator 212 may obtain various transmitter and receiver testing measurements for the DUT 220 such as transmitting power measurements, received signal strength indication (RSSI) measurements, channel power measurements, mean power measurements, radio resource control (RRC) power measurements, adjacent channel leakage ratio (ACLR) measurements, spectrum emission mask measurements, power versus time measurements, phase and amplitude versus time (PAvT) measurements, phase and frequency error measurements, error vector magnitude (EVM) measurements, frequency error waveform quality measurements, radio frequency (RF) generation measurements, output RF spectrum monitoring, and so forth.

In one or more embodiments, the wireless emulator 212 may obtain transmitter and receiver testing measurements for the DUT 220 over the wireless connection 230. In various implementations, the wireless emulator 212 may comprise a CPU for formatting the test data received through the wireless connection 230 and for storing the test data in a readily accessible area for substantially real-time presentation.

Once a particular test or set of testing procedures has completed, a command may be sent from and/or through the wireless emulator 212 over the wireless connection 230 instructing the DUT 220 to perform additional testing. After decoding the command, the DUT 220 may send and acknowledgement over the wireless channel 230 informing the wireless emulator 212 that additional testing may be performed. The wireless emulator 212 then may perform the additional testing on the DUT 220.

As described above, the calibration test bench 210 may be arranged to support complete wireless RF calibration for the DUT 220. In such cases, all test command instructions are sent to DUT 220 over the wireless connection 230 (e.g., RF connection). At the same time, the DUT 220 is able to communicate with the wireless emulator 212 over the wireless connection 230 and respond to the calibration test bench 210 acknowledging receipt of such tests commands. The PC 214 may be arranged to control the wireless emulator 212 and to instruct the wireless emulator 212 to perform calibration according to a certain set of calibration procedures.

The wireless emulator 212 may be arranged to synchronize with the DUT 220 using the wireless connection 230. The wireless emulator 212 by itself may recognize when the DUT 220 is ready for calibration and send the test commands to the DUT 220. The wireless emulator 212 may then perform certain testing operations. For example, the wireless emulator 212 may measure the power output from the DUT 220 when such testing operations are performed. Because the wireless connection 230 is used for calibration rather than a peripheral serial connection (e.g., UART connection), the time required for calibration may be reduced.

FIG. 3 illustrates a logic flow 300 in accordance with one or more embodiments. The logic flow 300 may be performed by various systems and/or devices and may be implemented as hardware, software, and/or any combination thereof, as desired for a given set of design parameters or performance constraints. For example, the logic flow 300 may be implemented by a logic device (e.g., processor) and/or logic (e.g., instructions, data, and/or code) to be executed by a logic device.

The logic flow 300 may comprise establishing at least one of a wireless connection and a wired connection to a calibration test bench (block 302). The one or more connections may be established by a DUT 120 implemented by a mobile computing device. In one or more embodiments, the wireless connection may comprise an RF connection, and the wired connection may comprise a serial peripheral connection such as a USB connection or UART connection.

In the embodiment of FIG. 1, both a wireless connection 130 and a wired connection 132 are established to calibrate the DUT 120. The wireless connection 130 (e.g., RF connection) may be established between the wireless emulator 112 of the calibration test bench 110 and the antenna system 126 and/or transceiver module 124 of the DUT 120. A wired connection 132 (e.g., UART connection) may be established between the I/O interface 118 (e.g., serial connection port) of the calibration test bench 110 and the I/O interface 128 (e.g., serial connection port) of the DUT 120.

In the embodiment of FIG. 2, only a wireless connection 230 is established to calibrate the DUT 220. The wireless connection 230 (e.g., RF connection) may be established between the wireless emulator 212 of the calibration test bench 210 and the antenna system 226 and/or transceiver module 224 of the DUT 120.

The logic flow 300 may comprise receiving one or more test command instructions from the calibration test bench (block 304). In the embodiment of FIG. 1, test commands may be received over the wired connection 132 for synchronizing the calibration test bench 110 with the DUT 120 and for instructing the DUT 120 to perform various operations required for calibration. In the embodiment of FIG. 2, test commands may be received by the DUT 220 over the wireless connection 230.

In one or more embodiments, the test command instructions may be communicated according to a wireless device calibration protocol. The wireless device calibration protocol may comprise, for example, an RF chain defining the synchronization and command format between the wireless emulator 212 and the DUT 220. The command format may define the various test commands and codes required to calibrate the DUT 220. In various implementations, the wireless device calibration protocol may be supported by the particular type of DUT 220 and/or calibration test set.

The logic flow 300 may comprise sending an acknowledgement to the calibration test bench (block 306). In one or more embodiments, after entering the calibration mode, an acknowledgement may be sent. In some implementations, the acknowledgement may be sent over the wired connection 132. In other implementations, an acknowledgement may be sent over the wireless connection 130, 230. Additionally, receipt of one or more test commands may be acknowledged even when in the calibration mode. By receiving an acknowledgment of the calibration mode and/or test commands costly delays may be avoided and the time needed for calibration may be reduced.

The logic flow 300 may comprise executing the test command instructions and providing test data to the calibration test bench (block 308). The test commands, when executed, may cause synchronization with the calibration test bench 110, 210 and calibration operations including, for example, enter a certain mode such as a calibration mode, switch to a different mode, select frequency band, switch frequency band, select channel, switch to a different channel, transmit test signal, receive test signal, and so forth.

In one or more embodiments, test data may be obtained for various transmitter and receiver testing measurements over the wireless connection 130, 230. The measurements may comprise, for example, one or more of transmitting power measurements, RSSI measurements, channel power measurements, mean power measurements, RRC power measurements, ACLR measurements, spectrum emission mask measurements, power versus time measurements, PAvT measurements, phase and frequency error measurements, EVM measurements, frequency error waveform quality measurements, RF generation measurements, output RF spectrum monitoring, and so forth. In various implementations, test data may be formatted and stored by a CPU in a readily accessible area for substantially real-time presentation.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
    at least one of a device under test and a calibration test bench to establish at least one of a wireless connection and a wired connection between the device under test and the calibration test bench,
    wherein the device under test wirelessly receives test command instructions from the calibration test bench over the wireless connection and, in response, sends an acknowledgment to the calibration test bench, the command instructions comprising a command to synchronize, and to enter a certain mode.

2. The apparatus of claim 1, the device under test comprising a mobile computing device.

3. The apparatus of claim 1, the calibration test bench to perform calibration of the device under test according to a calibration test set.

4. The apparatus of claim 3, the calibration test set comprising a calibration test set for one or more of: Code Division Multiple Access (CDMA), Wide-band CDMA (WCDMA), CDMA-2000, CDMA/1xRTT, Evolution Data Optimized (EVDO), Evolution For Data and Voice (EVDV), Global System for Mobile Communications (GSM), General Packet Radio Service (GPRS), Enhanced GPRS (EGPRS), Enhanced Data Rates for Global Evolution (EDGE), Universal Mobile Telephone System (UMTS), High Speed Downlink Packet Access (HSDPA), and High Speed Uplink Packet Access (HSUPA).

5. The apparatus of claim 1, the calibration test bench comprising a wireless emulator.

6. The apparatus of claim 1, the calibration test bench comprising a dynamic power supply.

7. The apparatus of claim 1, the command instructions comprising a command to perform one or more of: switch to a different mode, select frequency band, switch frequency band, select channel, switch to a different channel, transmit test signal, and receive test signal.

8. The apparatus of claim 1, the acknowledgement sent over a wired connection.

9. The apparatus of claim 1, the acknowledgement sent over a wireless connection.

10. An apparatus comprising:
    at least one of a device under test and a calibration test bench to establish a wireless connection between the device under test and the calibration test bench, wherein the device under test receives test command instructions from the calibration test bench over the wireless connection according to a wireless device calibration protocol, the command instructions comprising a command to synchronize, and to enter a certain mode.

11. The apparatus of claim 10, the device under test comprising a mobile computing device.

12. The apparatus of claim 10, the calibration test bench to perform calibration of the device under test according to a calibration test set.

13. The apparatus of claim 12, the calibration test set comprising a calibration test set for one or more of: Code Division Multiple Access (CDMA), Wide-band CDMA (WCDMA), CDMA-2000, CDMA/1xRTT, Evolution Data Optimized (EVDO), Evolution For Data and Voice (EVDV), Global System for Mobile Communications (GSM), General Packet Radio Service (GPRS), Enhanced GPRS (EGPRS), Enhanced Data Rates for Global Evolution (EDGE), Universal Mobile Telephone System (UMTS), High Speed Downlink Packet Access (HSDPA), and High Speed Uplink Packet Access (HSUPA).

14. The apparatus of claim 10, the calibration test bench comprising a wireless emulator.

15. The apparatus of claim 10, the calibration test bench comprising a dynamic power supply.

16. The apparatus of claim 10, the command instructions comprising a command to perform one or more of: switch to a different mode, select frequency band, switch frequency band, select channel, switch to a different channel, transmit test signal, and receive test signal.

17. The apparatus of claim 10, the wireless device calibration protocol comprising a radio frequency (RF) chain defining synchronization and command format between the device under test and the calibration test bench.

18. The apparatus of claim 10, the wireless device calibration protocol supported by at least one of a type of device under test and a calibration test set.

19. A method comprising:
    establishing at least one of a wireless connection and a wired connection to a calibration test bench;

receiving test command instructions from the calibration test bench over the wireless connection, the command instructions comprising a command to synchronize, and to enter a certain mode; and sending an acknowledgement to the calibration test bench in response to the test command instructions.

20. The method of claim 19, comprising sending the acknowledgement over a wired connection.

21. The method of claim 19, comprising sending the acknowledgement over a wireless connection.

22. A method comprising:

establishing at least one of a wireless connection and a wired connection to a device under test;

sending, over the wireless connection, test command instructions to the device under test, the command instructions comprising a command to synchronize, and to enter a certain mode; and receiving an acknowledgement in response to the test command instructions.

23. The method of claim 22, comprising receiving the acknowledgement over a wired connection.

24. The method of claim 22, comprising receiving the acknowledgement over a wireless connection.

25. A method comprising:

establishing a wireless connection to a calibration test bench; and receiving test command instructions from the calibration test bench over the wireless connection according to a wireless device calibration protocol, the command instructions comprising a command to synchronize, and to enter a certain mode.

26. The method of claim 25, the wireless device calibration protocol comprising a radio frequency (RF) chain defining synchronization and command format between a device under test and the calibration test bench.

27. The method of claim 25, the wireless device calibration protocol supported by at least one of a type of device under test and a calibration test set.

28. A method comprising:

establishing a wireless connection to a device under test bench; and sending test command instructions from the calibration test bench over the wireless connection according to a wireless device calibration protocol, the command instructions comprising a command to synchronize, and to enter a certain mode.

29. The method of claim 28, the wireless device calibration protocol comprising a radio frequency (RF) chain defining synchronization and command format between the device under test and a calibration test bench.

30. The method of claim 28, the wireless device calibration protocol supported by at least one of a type of the device under test and a calibration test set.

* * * * *